(12) United States Patent
Meili

(10) Patent No.: US 6,570,647 B1
(45) Date of Patent: May 27, 2003

(54) MEASURING METHOD AND MEASURING SYSTEM

(76) Inventor: Reto T. Meili, Hinterbergstrasse, 8044-Zürich (CH)

( * ) Notice: Subject to any disclaimer, the term of this patent is extended or adjusted under 35 U.S.C. 154(b) by 94 days.

(21) Appl. No.: 09/715,296

(22) Filed: Nov. 17, 2000

(30) Foreign Application Priority Data

Nov. 20, 1999 (EP) .............................. 99123073

(51) Int. Cl.$^7$ .............................. G01P 3/36; G01F 1/00
(52) U.S. Cl. .......................... 356/28; 356/28.5; 73/861
(58) Field of Search ..................... 356/28, 28.5; 73/861

(56) References Cited

U.S. PATENT DOCUMENTS

| | | | | |
|---|---|---|---|---|
| 4,036,557 A | * | 7/1977 | Christensen | ................. 356/28 |
| 4,553,836 A | * | 11/1985 | Meier et al. | |
| 4,804,263 A | * | 2/1989 | Schodl | ........................ 356/28 |
| 4,948,257 A | * | 8/1990 | Kaufman et al. | |
| 5,131,741 A | * | 7/1992 | Zweben | ........................ 356/28 |
| 5,335,070 A | * | 8/1994 | Pflibsen et al. | |
| 5,502,558 A | * | 3/1996 | Menders et al. | ........... 356/28.5 |
| 5,587,785 A | * | 12/1996 | Kato et al. | ................. 356/28.5 |
| 5,610,703 A | * | 3/1997 | Raffel et al. | ................... 356/28 |

FOREIGN PATENT DOCUMENTS

| | | |
|---|---|---|
| CH | 572 623 | 2/1976 |
| DE | 239 472 | 9/1986 |
| EP | 0 100 304 | 2/1984 |
| EP | 0 479 676 | 4/1992 |
| EP | 0 902 276 | 3/1999 |

OTHER PUBLICATIONS

WO 93/19376, Sep. 1993, Method and Device for Optically Measuring the Size or Speed of an Object Moving Through a Fluid.

F. Onofri et al., Size, Velocity, and Concentration in Suspension Measurements of Spherical Droplets and Cylindrical Jets. Jul. 1999, pp. 4681–4690.

* cited by examiner

Primary Examiner—Stephen C. Buczinski
(74) Attorney, Agent, or Firm—Pearne & Gordon LLP

(57) ABSTRACT

The invention relates to a method for the determination of physical properties of flows or currents using at least one sensor head, wherein fluctuations of a parameter are detected by at least three sensor heads, said detected fluctuations of a parameter are converted into measuring signals. A time of flight between a first pair of sensor heads of said at least three sensor heads is determined from correlating said measuring signals created by the two measuring signals of said first pair of sensor heads. Then, a quotient of a distance between said pair of sensor heads and said time of flight is evaluated, a time of flight, a distance and a quotient are evaluated for a second pair of sensor heads of said at least three sensor heads, and from the quotients evaluated for the two pairs of sensor heads, a two dimensional velocity is calculated.

21 Claims, 9 Drawing Sheets

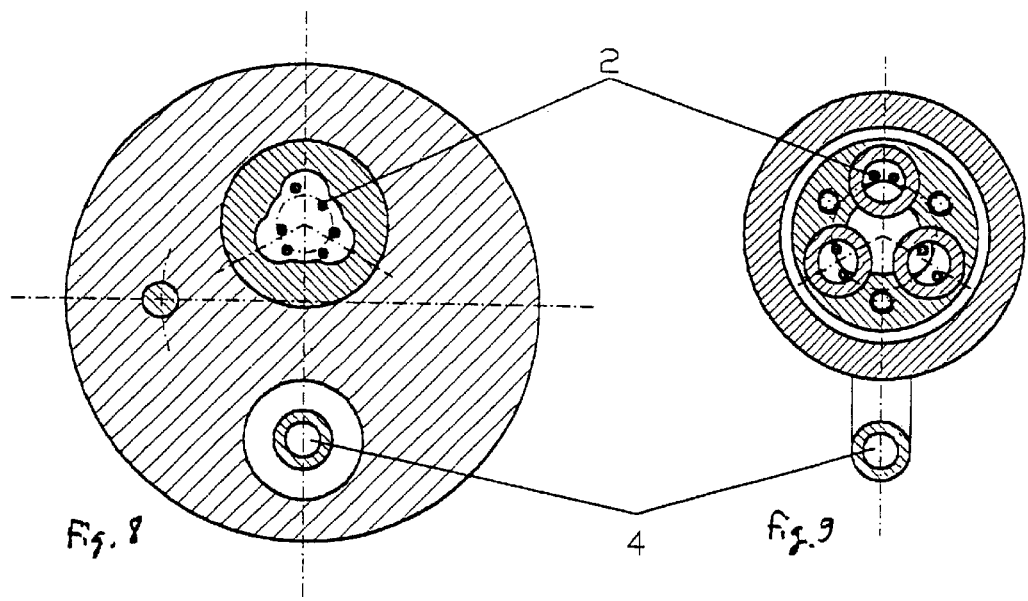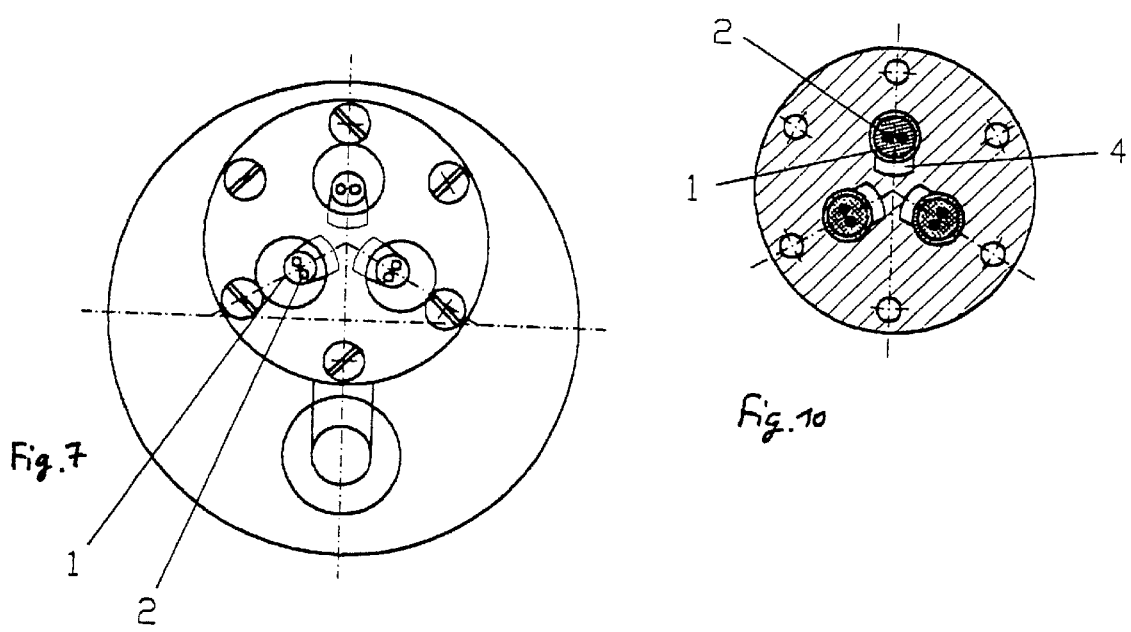

MEASURING METHOD AND MEASURING SYSTEM

FIELD OF THE INVENTION

The present invention relates to a measuring method and systems for the determination of concentrations or velocities of flows or currents. It more particularly relates to a measuring method and a system to apply the measuring method according to the definition of the claims.

BACKGROUND OF THE INVENTION

The determination of concentrations or velocities of flows or currents is of great importance in research and industry. It is e.g. about multiphase flows of solids in gases or liquids, or gas bubbles in liquids, or of liquid droplets in gases or liquids etc. It is also e.g. about moving matter, bulk solids, liquids, surfaces of liquids, webs of paper and fabric etc. The determination of concentrations or velocities of flows or currents reveals a variety of information as e.g. densities, degree of turbulence etc.

Existing measuring methods as e.g. the dust concentration measurement according to the transmission principle or e.g. the laser Doppler anemometry have disadvantages. These measuring systems are susceptible to soiling and may not be used at high or low temperatures, respectively. Therefore cleanings and dismantlements of the measuring systems are necessary, therefore continuos measurements/process monitoring becomes impossible. Such measuring systems are furthermore expensive and maintenance and application are costly.

SUMMARY OF THE INVENTION

It is the objective of the present invention to provide a measuring method for the determination of concentrations or velocities of flows or currents, which overcomes disadvantages of existing methods. It is a further objective of the invention to provide a measuring system, that eliminates disadvantages of existing systems. The measuring method and its measuring system should be compatible with existing and popular industry standards.

This objective is achieved by the invention according to the claims.

The invention serves to determine concentrations or velocities of flows or currents. It concerns flows consisting of different phases as e.g. solids in gases or liquids, or gas bubbles in liquids, or liquid droplets in gases or liquids etc. and it concerns flows as e.g. moving matter, bulk solids, liquids, surfaces of liquids, webs of paper and fabric etc.

For the determination of concentrations of flows or currents, physical quantities characteristic for concentrations as e.g. backscattered, emitted or transmitted light, radiation or sonic intensities, permeabilities, dielectric constants (permittivities), conductivities, diffractions of micro waves, magnetic or nuclear magnetic resonances (NMR) or temperatures are measured. For the quantitative determination of e.g. solids concentrations calibration parameters are determined by performing e.g. calibration experiments measuring characteristic physical quantities at different known concentrations and hence deriving a mathematical function. Such calibration parameters depend generally on the relevant physical properties of the materials of the flows or currents considered.

For the determination of velocities of flows or currents, the fluctuations of characteristic physical quantities as e.g. backscattered, emitted or transmitted light, radiation or sonic intensity, permeability, dielectric constant (permittivity), conductivity, diffraction of micro waves, magnetic or nuclear magnetic resonance (NMR) or temperatures, or are measured locally by means of two or three sensor heads and correlated using stochastic methods. The comparison of several of such measured measuring signals allows the correlative determination velocities of e.g. solids, clusters or bubbles. The velocity determination is performed for one or two dimensional flows or currents. The thus used measuring system comprises a measuring probe, in which all optical and electronical components are integrated and protected effectively from environmental influences. It further comprises a power supply for the supply of the measuring probe and a computerized analysis unit for the analysis of the measuring signals measured by the measuring probe. Particularly for the velocity determination, a measuring system with two or three sensor heads placed at different positions is used. The measuring resolution is determined by the distance of the sensor heads from each other. From correlations times of flight between the sensor heads are determined. Flow or current velocities result from quotients of distances of sensor heads and times of flight.

BRIEF DESCRIPTION OF THE DRAWINGS

FIG. 7 is a front view of a part of the embodiment of the measuring probe of FIG. 6.

FIG. 8 is a first sectional view along line AA' of a part of the embodiment of the measuring probe of FIG. 6.

FIG. 9 is an additional sectional view along line BB' of a part of the embodiment of the measuring probe of FIG. 6.

FIG. 10 is an additional sectional view along line CC' of a part of the embodiment of the measuring probe of FIG. 6.

FIG. 18b is a flow chart further showing an embodiment of a calibration process used to determine calibration parameters used in the process of FIG. 18a.

DETAILED DESCRIPTION OF PREFERRED EMBODIMENTS OF THE INVENTION

The present measuring method for the determination of concentrations or velocities of flows or currents is based on the measurement of amplitudes or fluctuations of characteristic physical parameters as e.g. backscattered, emitted or transmitted light, radiation or sonic intensities, permeabilities, dielectric constants (permittivities), conductivities, diffractions of micro waves, magnetic or nuclear magnetic resonances (NMR) or temperatures. The measuring method is applicable for the measurement for all kind of amplitudes or fluctuations. In order to provide a concise description, in the following the invention is explained in detail using the example of light backscattering of flows or currents only. Knowing the present invention, an expert may apply the measuring method for the measurement for other, not in detail explained amplitudes or fluctuations of characteristic physical parameters of flows or currents.

Figure 13:
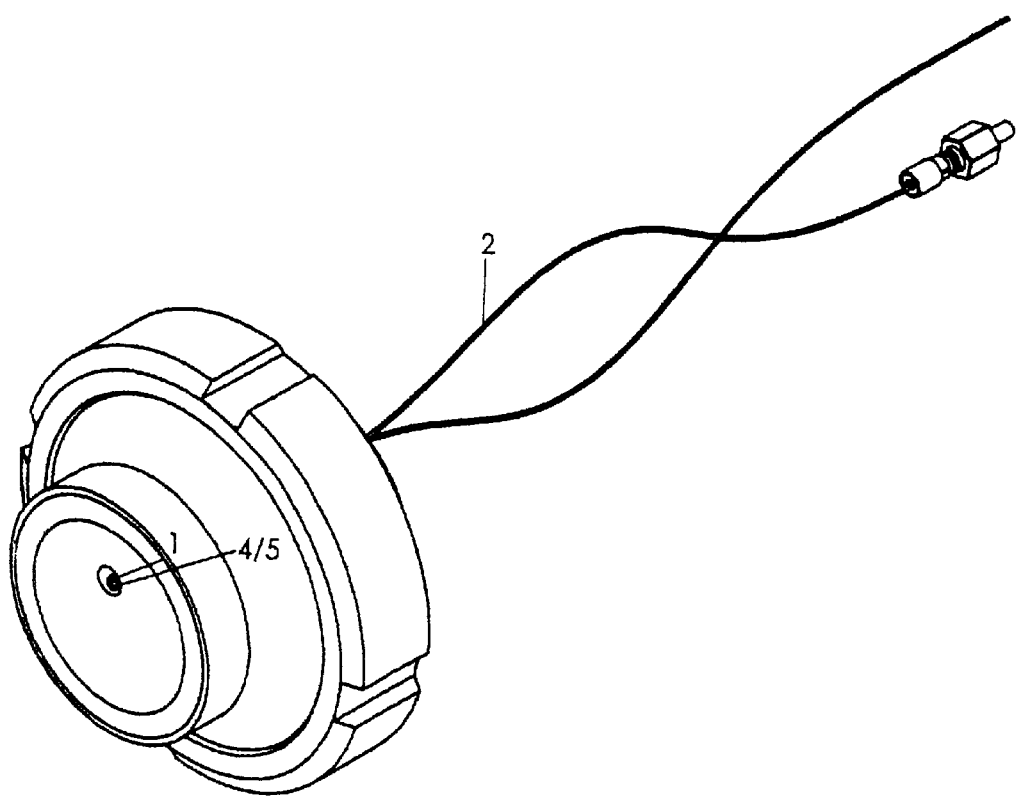
FIG. 13 is a perspective view of a part of a further embodiment of a measuring probe of a measuring system with one measuring channel.

Now referring to the figures, for the concentration determination of flows or currents as a parameter e.g. the backscattered light intensity may be measured. For a quantitative determination of e.g. solids concentrations calibration parameters are determined by using a calibration curve, which depends for the exemplary parameter backscattered light on optical properties as color, surface of the solids and their particle size. Advantageous a measuring system with at least one sensor head 1 (cf. FIG. 13) is used or a measuring system with at least two sensor heads positioned displaced to each other 1, 1', 1" (cf. FIG. 1, 2) is used. With the measuring system parameters are measured and the measured parameters are converted into measuring signals. These measuring signals are plotted as a function of the concentration and related to each other by a mathematical function using calibration parameters.

Figure 1:
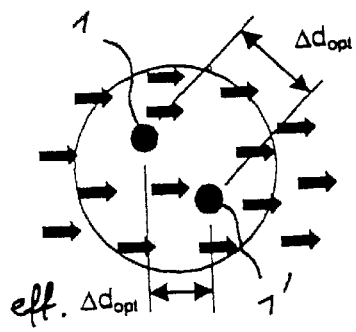
FIG. 1 schematically shows a part of a measuring system to apply the measuring method, comprising two measuring channels.
Figure 2:
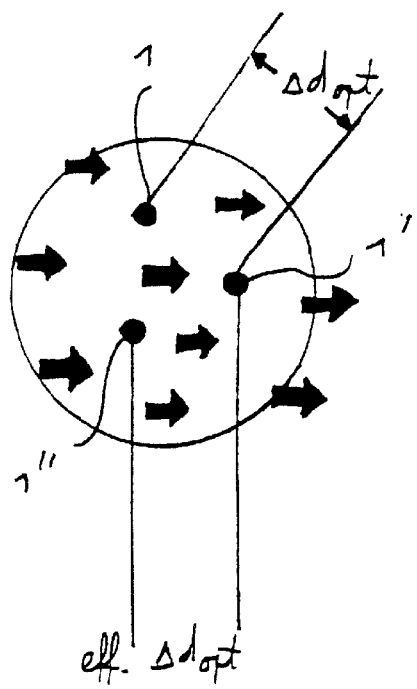
FIG. 2 schematically shows a part of a measuring system to apply the measuring method with three measuring channels.

For the velocity determination of flows or currents, the fluctuations of the backscattered light intensity are measured and correlated using stochastic methods. The comparison of several of such measured measuring signals allows the correlative determination of velocities of e.g. solids, clusters or bubbles. For the velocity determination of a one dimensional flow, e.g. in a tube, preferably a measuring system with two sensor heads positioned displaced to each other 1, 1' (cf. FIG. 1) is used. For the velocity determination of a two dimensional flow in a plane preferably a measuring system with three sensor heads placed at different positions 1, 1', 1" (cf. FIG. 2) is used. It is presumed that macroscopic homogenous flows or currents are present, that are similar in the measuring volume in front of the different sensor heads. Further, for a correct measurement, all sensor heads have to be positioned in a way, that they detect backscattered light from the flows or currents. This is illustrated in FIGS. 1 and 2 by parallel flow arrows of essentially equal length. The two or three sensor heads emit light, the light forming two or three light rays. The measuring resolution is defined by the optical distance between the sensor heads $\Delta d_{opt}$. Preferably, the sensor heads are aligned in a measuring plane perpendicular to the flows or currents. In the example, where light backscattering is used as a parameter, the distance between the sensor heads is defined to be the optical distance between the sensor heads, i.e. the mutual distance of the rays emitted by the sensor heads at the spot of the backscattering in the measuring plane. The effective optical distance eff. $\Delta d_{opt}$ is the projection of the optical distance between the sensor heads $\Delta d_{opt}$ parallel to the flow into the measuring plane perpendicular to the flows or currents.

Typical optical distances between sensor heads are a few millimeters. Typical velocities, that may be measured by the measuring system, are between 0.05 and 200 m/s. Concentrations may be measured by the measuring system with sampling rates of 1 to 100 kHz. Velocities may be measured by the measuring system with measuring frequencies of 10 to 5,000 Hz. These values are only examples and depend on the hardware used (measuring probe, computerized analysis unit, measuring lines, etc.). They therefore do not constrict the application range of the invention.

Figure 16A:
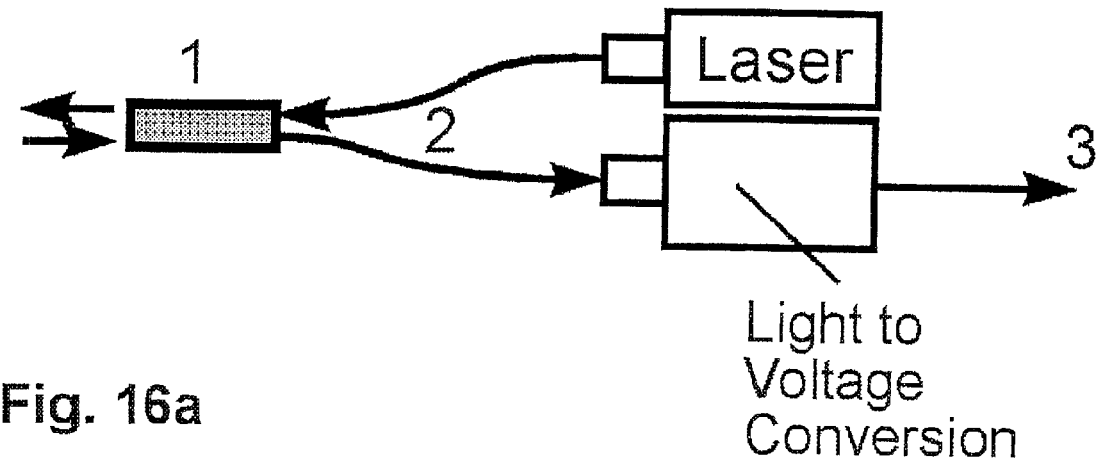
FIG. 16a schematically shows a part of the measuring probe with one sensor head and light conductor means conducting the backscattered light to a sensor.

FIGS. 3 to 10 and 13 show parts of exemplary embodiments of sensor heads 1, 1', 1" of the measuring system. The light is detected by a specially designed optics, which defines a measuring volume that depends on the application, and guided by light conductor means 2 into a measuring probe 10. The intensity of the light backscattered by the flows or currents is guided by light conductor means 2 to sensors of the measuring probe where it is detected. An according scheme is shown in FIG. 16a, where also the light source, i.e. a laser is displayed. In fact, all kinds of light sources such as lasers, cold light lamps, etc. may be used in the present measuring method to determine concentrations or velocities. Known lasers are e.g. laser diodes, known light conductor means are e.g. optical fibers, known sensors are e.g. photo diodes. These sensors yield measuring signals, which are guided by measuring lines 3, 3', 3" to an analysis unit. The measuring signals of the two or three sensor heads are preferably guided by two or three measuring lines, i.e. each sensor head has a measuring line by itself.

Such a photometric detection of the backscattered light intensities may be very sensitive, so that even at very uniform flows the measuring signals fluctuate stochastically. These fluctuations are analyzed for the velocity determination by correlating the measuring signals of the two or three sensor heads. Using these correlations, the times of flight are determined corresponding to the sensor heads. The time of flight $\tau$ is defined as the time corresponding to a favored correlation coefficient. The numerical calculation of the correlation uses known mathematical methods, e.g. as cross correlation using the Wiener-Khinchin-theorem or as Moebius-correlation, both known to experts in this field and not explained in more details here. In the case of the cross correlation, the favored correlation coefficient is the maximum correlation coefficient. To carry out the correlation, knowing the present invention, an expert has a large variety of possibilities.

In the case of the 1-dimensional velocity determination using two sensor heads, the absolute value of the velocity V in direction of the connection of the two sensor heads results directly from the quotient of the effective optical distance between the sensor heads eff. $\Delta d_{opt}$ and the time of flight $\tau$:

$$V = \frac{\text{eff.} \cdot \Delta d_{opt.}}{\tau}$$

Figure 12:
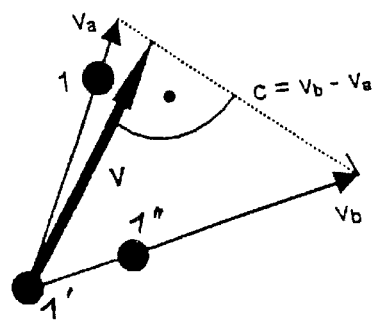
FIG. 12 schematically shows an example of the determination of a velocity vector.
Figure 3:
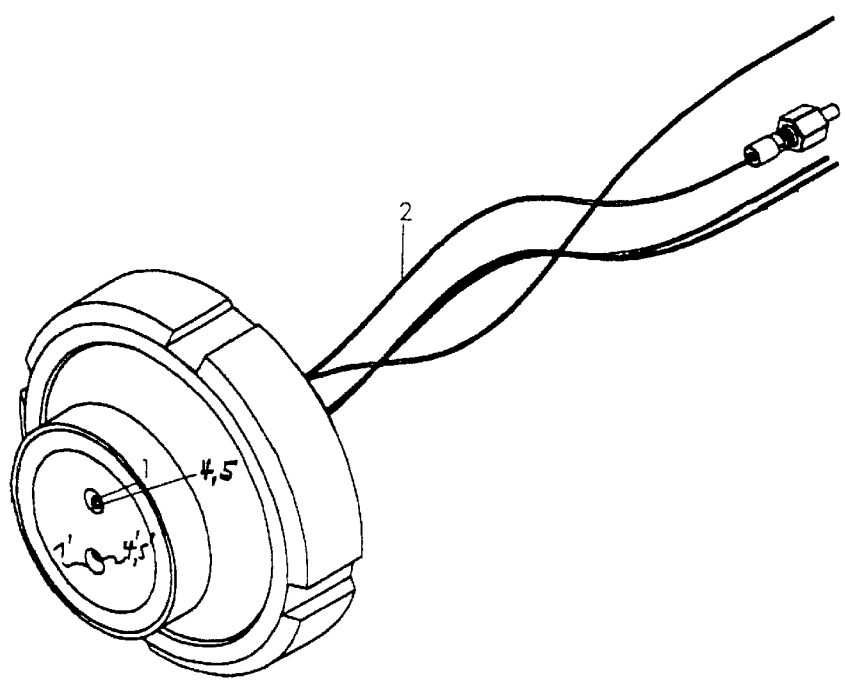
FIG. 3 is a perspective view of a part of a first embodiment of a measuring probe of a measuring system according to FIG. 1.
Figure 4:
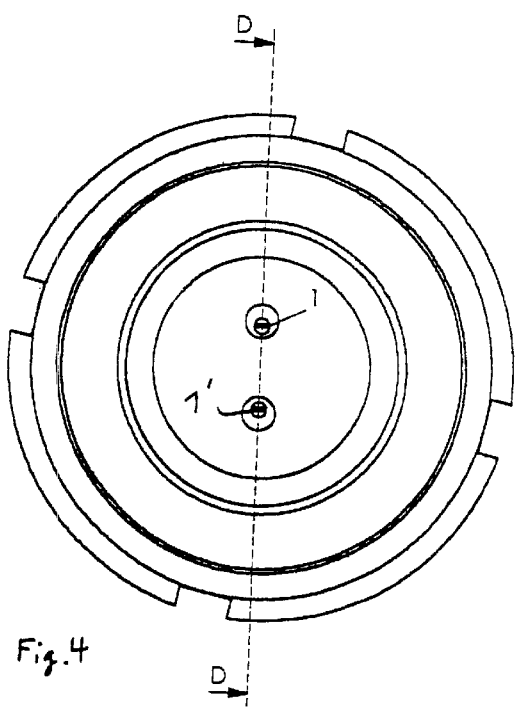
FIG. 4 is a front view of a part of the first embodiment of the measuring probe according to FIG. 3.
Figure 5:
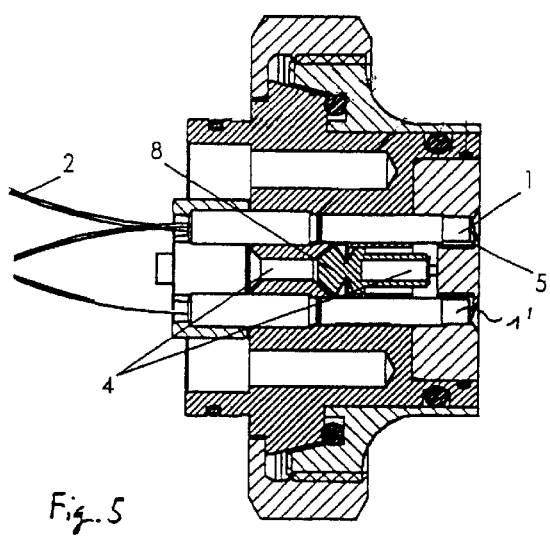
FIG. 5 is a sectional view along line DD' of a part of the first embodiment of the measuring probe according to FIG. 4.
Figure 6:
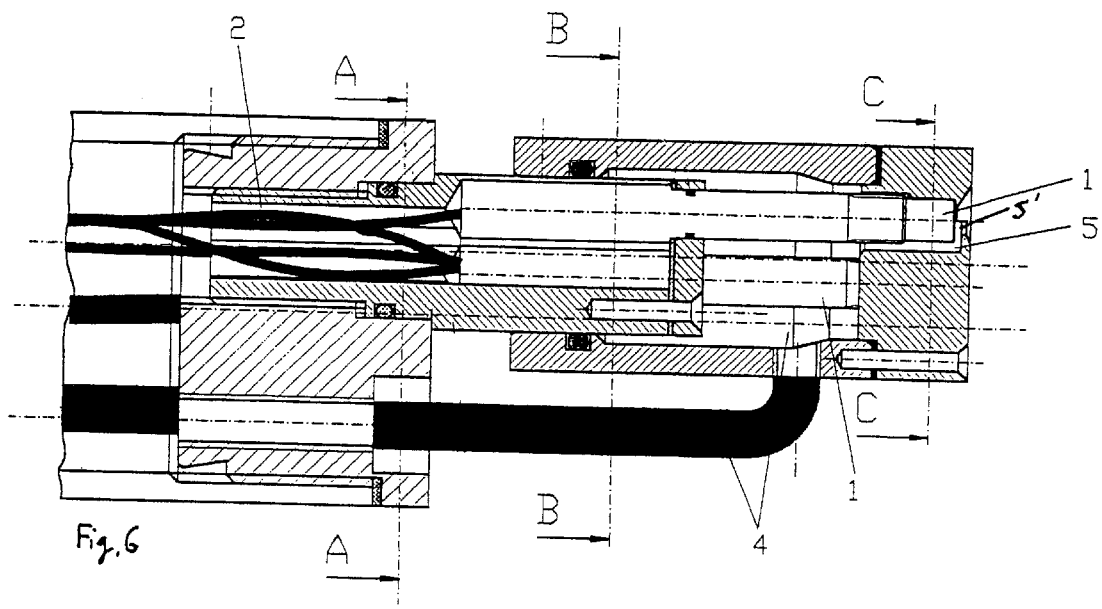
FIG. 6 is a sectional view of a part of a further embodiment of the measuring probe of a measuring system according to FIG. 2.

In the case of the 2-dimensional velocity determination using three sensor heads, three times of flight τ are determined in analogy to the 1-dimensional case. For this purpose, three effective optical distances between the sensor heads eff. $\Delta d_{opt}$ are used. By determining the quotient of these three effective optical distances between sensor heads eff. $\Delta d_{opt}$ and the corresponding times of flight τ three absolute velocity values $v_a$, $v_b$, $v_c$ are calculated. These absolute velocity values are associated to the measuring signals of two sensor heads. As an example, the absolute velocity value $v_a$ is associated to the measuring signals of the two sensor heads 1 and 1', the absolute velocity value $v_b$ is associated to the measuring signals of the two sensor heads 1' and 1" and the absolute velocity value $v_c$ is associated to the measuring signals of the two sensor heads 1" and 1. Out of these three absolute velocity values, two are necessary for the determination of an independent velocity vector. This velocity vector is related to one sensor head, to which two absolute velocity values are associated. E.g., the velocity vector, to which two absolute velocity values $v_a$ and $v_b$ are associated, is related to the first sensor head 1'. This determination of the velocity vector is preferably achieved by consideration of the vectors involved. This is illustrated in FIG. 12. The absolute value of a first absolute velocity value $v_a$ is drawn in direction of the connection of the first sensor head 1' to the first associated sensor head 1, the absolute value of a second absolute velocity value $v_b$ is drawn in direction of the connection of the first sensor head 1' to the second associated sensor head 1". A connecting vector $c = v_b - v_a$ is defined. The velocity vector v is the distance vector between the first sensor head 1' and the connecting line between the endings of the such drawn absolute velocity values $v_a$ und $v_b$:

$$v = v_a + \frac{-v_a \cdot c}{c^2} c = v_a + \frac{-v_a \cdot (v_b - v_a)}{(v_b - v_a)^2}(v_b - v_a)$$

By cyclic permutation of the three absolute velocity values, such a velocity vector can be determined for each sensor head. The vectors of a thus resulting velocity vector triples have to coincide within a measuring tolerance to be defined freely. This allows for a simple and quick check of the measuring method by comparing the three velocity vectors using a variation coefficient. Velocity vector triples that do not correspond to the defined measuring tolerance are rejected, since the initially postulated assumptions regarding homogeneity of the flows or currents etc. are obviously not fulfilled.

Figure 11:
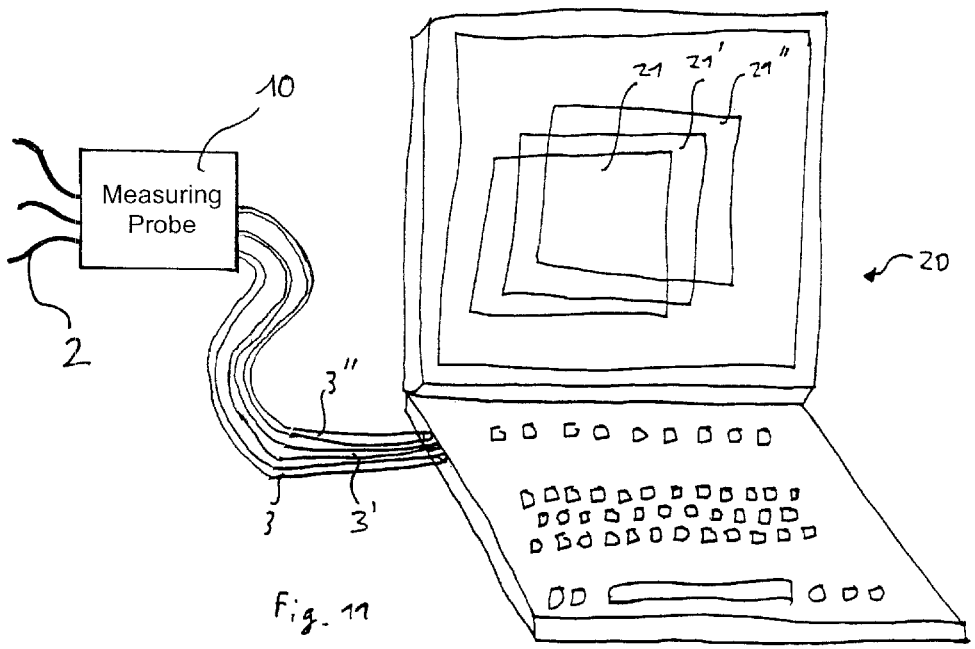
FIG. 11 schematically shows a part of an embodiment of an analysis unit of a measuring system.

Preferably, this analysis of the measuring signals is done in the analysis unit using measuring windows to be chosen freely. FIG. 11 shows a part of an embodiment of such an analysis unit 20 with shifted measuring windows 21, 21', 21". Measuring signals are fed by measuring lines 3, 3', 3". Each of these measuring windows comprises a defined number of measuring signals. As analysis units, commercially available computers with data acquisition interfaces may be used.

The present method allows the simultaneous measurement of concentrations and velocities in particular, be it off-line, on-line or in-line. Particularly, the present method allows a permanent in-line process monitoring. E.g. solids concentrations in the range of 1 g/m³–1,500 kg/m³ may be determined in-line.

Figure 14:
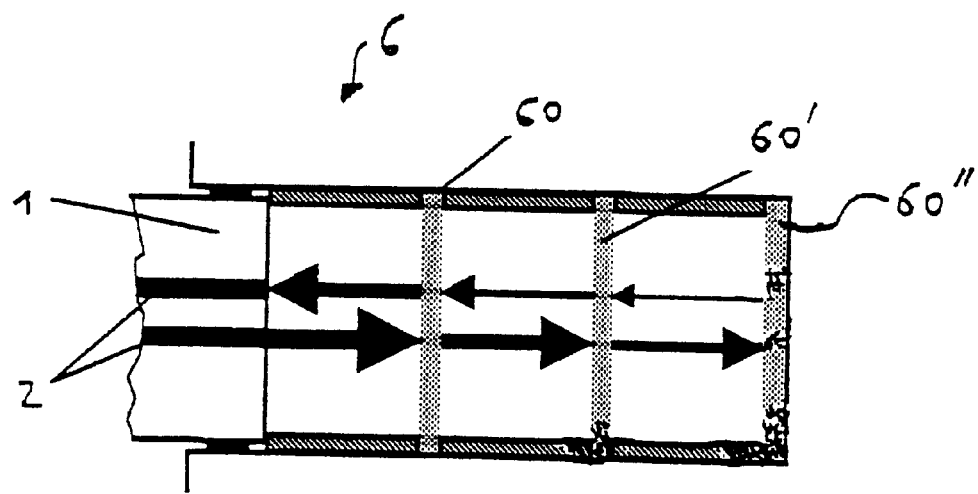
FIG. 14 is a sectional view of a part of an embodiment of a measuring probe of a measuring system with standardization unit.

The present method allows to standardize the detected physical parameters. A standardizing is optional and allows e.g. the determination of calibration data independently of a specific measuring instrument or in-situ checks of the stability of the measuring instruments. Such in-situ checks may be carried out in periodic or non periodic time intervals. Standardizing of the measured parameters is illustrated in FIG. 14 by an embodiment of a standardizing device 6. This is a standardizing device for e.g. concentration measurements of flows or currents using backscattered light intensities. In this embodiment, the standardizing device is a standardizing reflector in the form of a cap. This standardizing reflector is mounted onto at least one sensor head 1 with light conductor means 2 in a light transparent way. To avoid influences from extrinsic light the standardizing reflector itself is light impermeable and contains two or more for light semi-transparent reflector elements 60, 60', 60" positioned in the optical path of the emitted and reflected light. The reflector elements have e.g. a disk like shape and are fabricated of light semi-permeable material such as glass, plastic, metal, etc. By the thus repeated combination of reflection and transmission e.g. a 2-phase-flow or current is simulated. The total of the reflected light is detected as a parameter by at least one sensor head. The therefrom determined measuring signal is used as standardizing signal for the standardizing. Knowing the present invention, an expert has various possibilities for the realization of standardizing devices to use with the measuring system.

Figure 15:
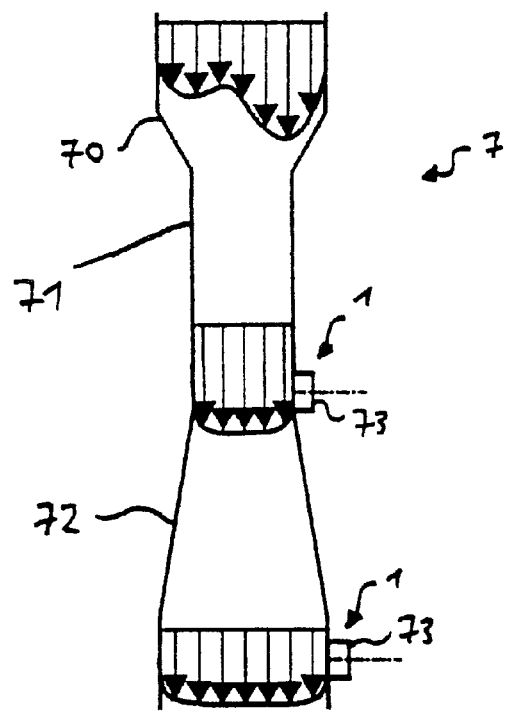
FIG. 15 is a sectional view of a part of an embodiment of a measuring probe of a measuring system with homogenization device.

In measurements of concentrations or velocities of flows or currents, the present invention in addition allows the determination of representative mean values. Such representative mean values are e.g. necessary for mass flow rate measurements. Such a determination of representative mean values, as demonstrated using an homogenization device 7 in the embodiment of FIG. 15., is optional. A homogenization device works e.g. using the physical parameter light intensity. It may e.g. be mounted in a transport duct for flows or currents upstream of at least one sensor head 1. The homogenization device features a convergent inlet 70 for the acceleration of the flow or current. Further, it features an homogenization part 71 for the homogenization of the concentration and velocity distribution of the flow or current. In the homogenization part e.g. solid strands of flow or current are dispersed by acceleration and/or elevated turbulence. The measuring volume is confined by the flow or current or it depends on the measuring principle and is not influenced by the homogenization device. Downstream of the homogenization device, a divergent exit 72 is positioned. This exit 72 may be e.g. a slim diffusor and allows to recover most of the pressure drop caused accelerating the flow or current at the inlet. The homogenization device may be adapted to different tube diameters. It may be operated with different measuring systems and has different possible measuring positions 73 for the installation of at least one sensor head. The confined or limited measuring volume of a sensor head mounted at the homogenization device covers a greater or the whole part of the tube diameter. Therefore, a greater part of flow or current, rendered more representative by means of an homogenization device, is measured, leading to an higher measuring accuracy.

Soilings by the flow or current medium may lead to measuring errors and measuring failures. To prevent such soilings of the sensor heads by the flow or current medium a cleaning unit is foreseen. This cleaning unit is optional, the measuring method is applicable without it. Particularly the cleaning unit is used for flow or current media, which tend to stick onto the sensor head easily and may cover them. In an embodiment, the cleaning unit consists of cleaning fluid flow between the sensor heads and the flow or current, in such a way that the flow or current can not reach the sensor heads. As cleaning fluid known industrial liquids and gases as water, air, inert gases, nitrogen, etc. may be used. Preferably, the cleaning fluid flows via inlet and exit lines 4, 4' and redirections 5 to a flat cleaning volume 5' between the sensor heads and the flow medium and thus prevents the flow or current medium from settling onto the sensor heads. Such a flat cleaning volume has e.g. a thickness of just a few millimeters forming a cleaning fluid film of just a few millimeters thickness. The inlet and exit lines and the redirections are designed and arranged in a way, that the cleaning fluid flow itself does not affect/disturb/falsify the concentration and velocity measurement. Preferably, the cleaning fluid flow is redirected by a redirection such that the cleaning fluid flow is mainly momentum free in direction of the axis of the sensor heads. Designing such a cleaning unit an expert has various design possibilities. As an example, in the embodiment of FIG. 5 redirections 5 are provided near the sensor heads 1 and optional check valves 8 are provided in the inlet lines 4.

Figure 16B:
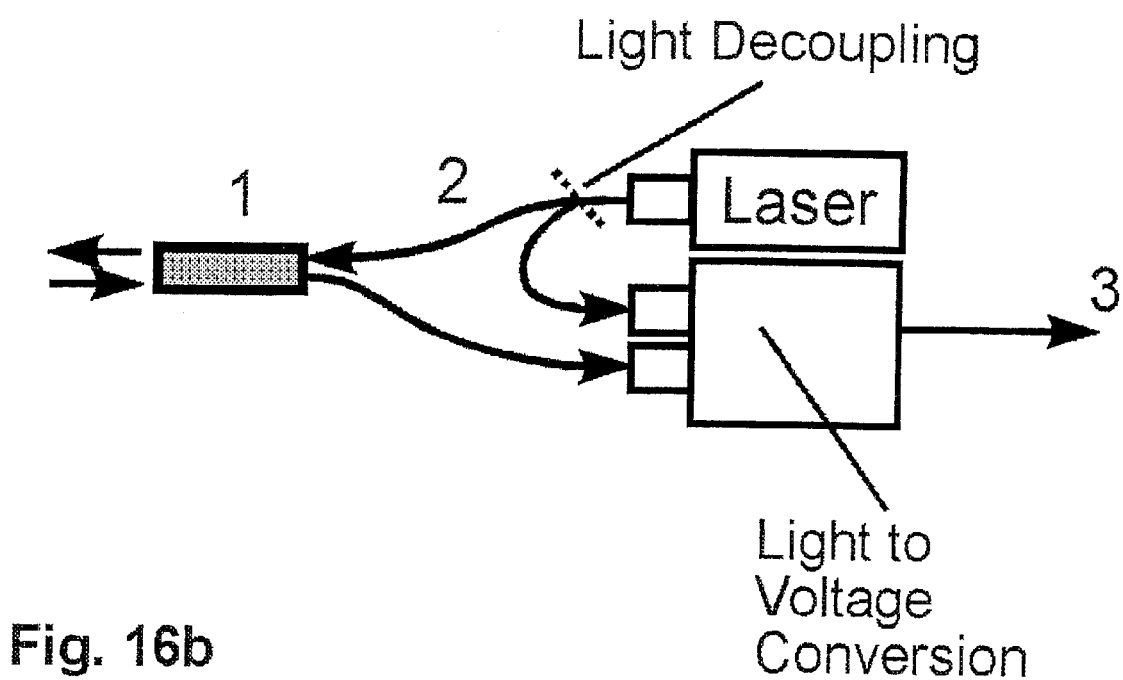
FIG. 16b shows the scheme of FIG. 16a, further comprising light guiding means for guiding a fraction of the emitted light to an additional sensor.
Figure 17:
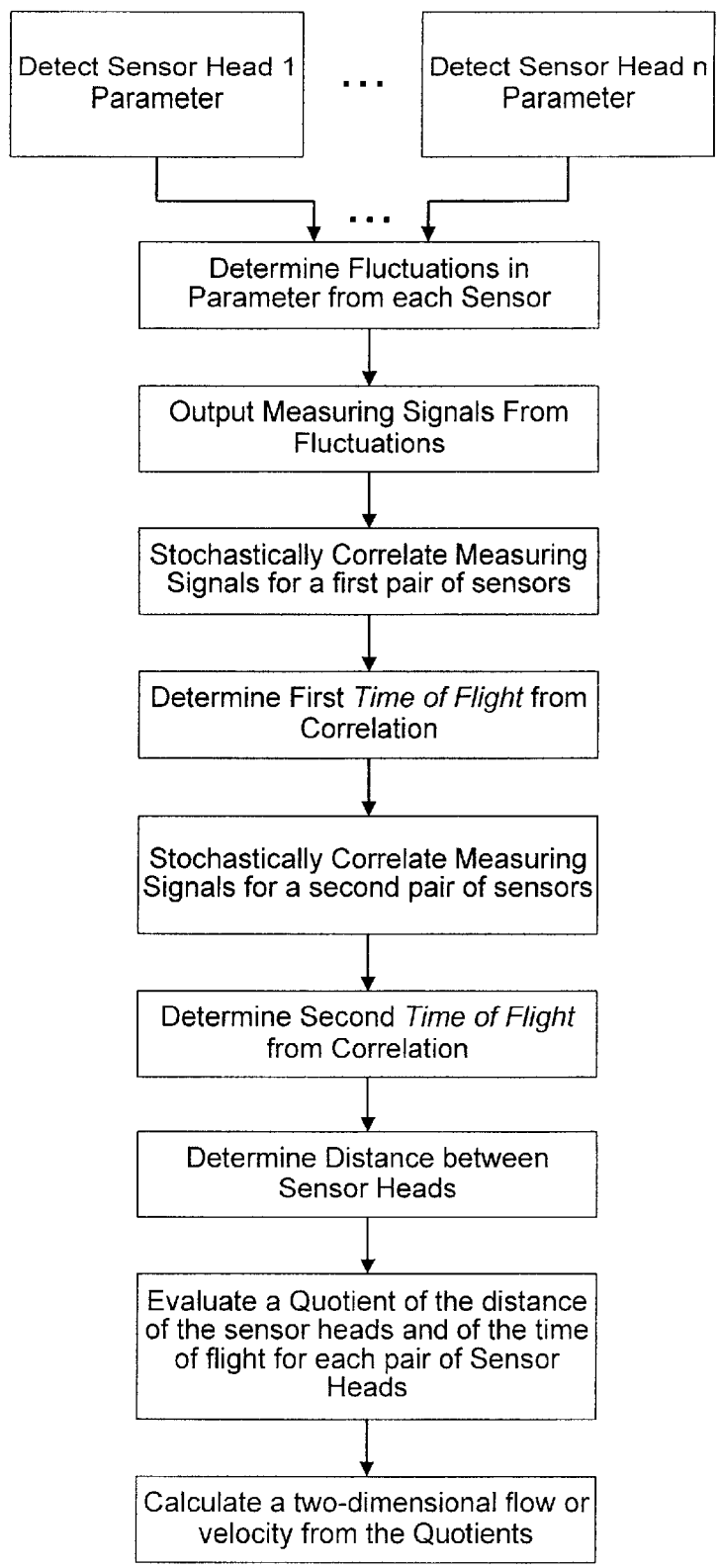
FIG. 17 is a flow chart showing one embodiment of a process for calculating flow velocity.
Figure 18A:
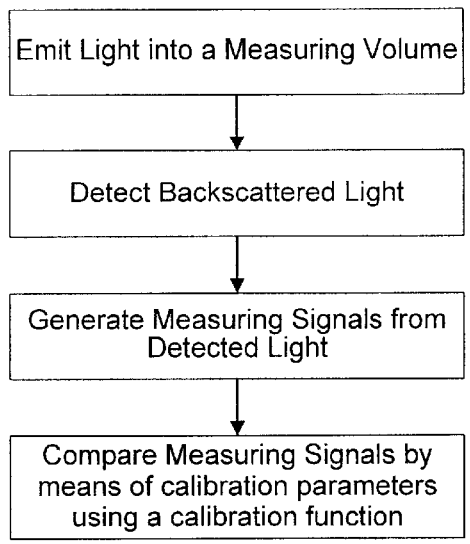
FIG. 18a is a flow chart showing an embodiment of a process for determining physical properties of flows or currents using at least one sensor head.
Figure 18B:
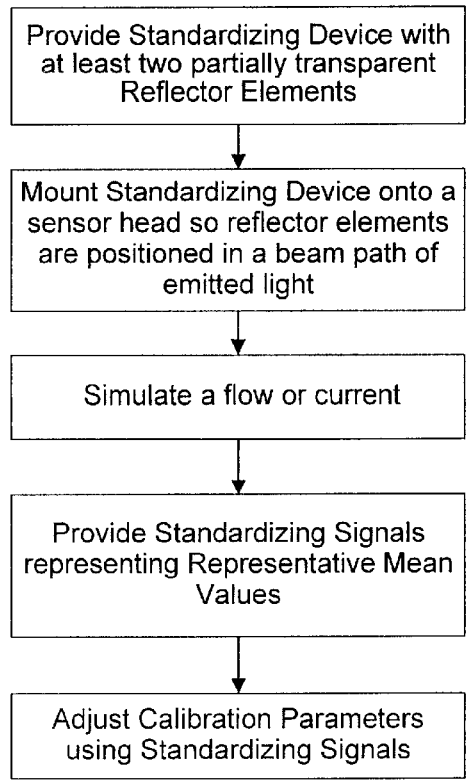

The stable and reproducible detection of small light intensities is difficult and requires the exclusion of mechanical (fibers!), electronic and temperature influences. If such influences could not be excluded, they have to be compensated for, e.g. temperature. Furthermore the light source used namely the laser has to be stable for longer time periods. To improve the accuracy and stability the alternative embodiment described with respect to FIG. 16b is proposed: In contrast to the embodiment shown in FIG. 16a, by means of a light decoupling device, a small fraction of the light guided by light conductor means 2 to the sensor head 1 is decoupled and guided to a photosensing device, which detects rather than one absolute light intensity now the quotient of the backscattered and the decoupled light intensity. Such a setup is less dependent on influences such as temperatures and thus allows higher accuracies and a higher long term stability.

What is claimed is:

1. A method for the determination of physical properties of flows or currents, comprising the steps of:
    a) independently and concurrently detecting a parameter by at least three sensor heads, the three sensor heads being in a fixed position during the determination of physical properties;
    b) determining, for each one of said at least three sensor heads, fluctuations of said parameter and converting them into a measuring signal;
    c) for a first pair of said at least three sensor heads correlating, using stochastic methods, the measuring signals created in the two sensors of said pair and determining a first time of flight from correlating the measuring signals;
    d) and, for a second pair of said at least three sensor heads, correlating, using stochastic methods, the measuring signals created in the two sensors of said pair and determining a second time of flight from correlating the measuring signals;
    e) determining a distance between said sensor heads of said first and of said second pair of sensor heads;
    f) for the first pair of sensor heads, evaluating a quotient of the distance of the sensor heads and of the first time of flight;
    g) and evaluating, for the second pair of sensor heads, a quotient of the distance of the sensor heads and of the second time of flight; and
    h) calculating from the quotients evaluated for the two pairs of sensor heads, a two dimensional flow or current velocity.

2. The method of claim 1, wherein said parameter is backscattered light, light being emitted into the flow or current by at least three sensor heads, wherein fluctuations of the backscattered light intensity are detected, the detected signals being converted into measuring signals, these measuring signals being correlated, wherein times of flight are calculated from said correlations between the sensor heads, wherein optical distances between said sensor heads are determined, and wherein said two dimensional flow or current velocities are calculated from the quotient of the optical distances between sensor heads and the times of flight.

3. The method of claim 2 wherein said optical distance between the sensor heads is an effective optical distance being the projection of the connecting line between the sensor heads along a direction parallel to the flow onto a measuring plane perpendicular to the flows or currents.

4. The method of claim 1, wherein sensor heads are positioned in a measuring plane perpendicular to the flows or currents.

5. The method of claim 1 wherein for the determination of a two dimensional velocity, a first vector and a second vector are determined, the first vector having the value of the quotient evaluated for a first pair of sensor heads and the direction connecting the sensor heads of said first pair of sensor heads, the second vector having the absolute value of the quotient evaluated for a second pair of sensor heads and having the direction connecting the sensor heads of said second pair of sensor heads, and wherein the velocity is equal to the distance between an origin point and the connection between the endings of the first and the second vector if the first and the second vector are drawn from said origin point.

6. The method of claim 1, wherein three sensor heads are used and wherein three values of said two dimensional velocity are determined from the three possible groups of a first and a second pair of sensor heads and wherein each of said three values of said two dimensional velocity is associated with the one sensor head belonging to both of said first and second pair of sensor heads.

7. The method of claim 6 wherein from the triple of two dimensional velocities a variation coefficient is calculated, the variation coefficient being a measure of the correspondence between the three two dimensional velocity values, and wherein vector triples that do not correspond to a defined measuring tolerance are rejected.

8. The method of claim 1 wherein said two dimensional velocity is determined permanently in an on-line mode the sensor heads mounted in-line.

9. A method for the determination of physical properties of flows or currents using at least one sensor head, wherein
    a) light is emitted into a measuring volume;
    b) backscattered light is detected by at least one sensor head;
    c) measuring signals are generated from the detected light;
    d) said measuring signals, as a function of a concentration of a component being present in the current of flow, are compared to each other by means of calibration parameters using a calibration function;
said method comprising, previous to or after the series of steps a) through c), determining calibration parameters using the steps of:
    e) providing a standardizing device with at least two partially transparent reflector elements;

f) mounting said standardizing device onto at least one sensor head in a manner that the reflector elements are positioned in a beam path of the emitted light;

g) and thereby simulating a flow or current and providing standardizing signals representing representative mean values; and h) adjusting the calibration parameters using said standardizing signals.

10. The method of claim 9 wherein said parameters comprise measuring data of light backscattering measurements, wherein said light produced by a light source is emitted by at least one sensor head into the flow or current and backscattered light intensities are detected, wherein measuring signals are determined, as a function of the concentration, and wherein the ratios between said measuring signals and the concentration are related to each other by a calibration function using calibration parameters.

11. The method of claim 9, wherein a concentration determination and a velocity determination are carried out simultaneously.

12. The method of claim 10 wherein a light decoupling device, light guiding means and a photosensing device are provided, wherein the intensity of a fraction of the light produced by said light source is measured by said photosensing device, and wherein said measuring signals are determined to be a ratio between said light intensity signals and said intensity of said fraction of the light produced by said light source.

13. A measuring system for the determination of physical properties of flows or currents by performing light backscattering measurements comprising:

a measuring probe with optical and electronic components and at least one sensor head; and further comprising a homogenization device, said homogenization device including a convergent flow or current inlet for the acceleration of the flow or current and a homogenization part for the homogenization of a concentration and velocity distribution of the flow or current, this homogenization device being mounted or mountable onto the transport line upstream of at least one of said sensor heads.

14. The measuring system of claim 13, wherein three sensor heads are provided for the determination of a two dimensional flow velocity.

15. The measuring system of claim 14, further comprising a standardizing device for measurements of physical properties of flows or currents by means of at least one sensor head comprising means for emitting light for backscattering measurements, the standardizing device comprising at least two partially transparent reflector elements.

16. A measuring system for the determination of physical properties of flows or currents by performing light backscattering measurements comprising:

a measuring probe with optical and electronic components and at least one sensor head, the sensor head being operable to emit a light beam, which light beam defines a sensor head axis, and means for injecting a cleaning fluid into a region between at least one of said sensor heads and the flow or current medium for preventing flow or current medium from settling onto said at least one sensor head, wherein these means for injecting a cleaning fluid comprise redirecting means configured in a manner that the cleaning fluid flow is essentially momentum free in a direction of the axis of the sensor head, such that a means for injecting the cleaning fluid are operable to create a flat cleaning volume between the sensor head and the flow medium comprising said cleaning fluid and the cleaning fluid flow does not affect the measurement.

17. The measuring system of claim 16, wherein three sensor heads are provided for the determination of a two dimensional flow velocity.

18. The measuring system of claim 17, further comprising a standardizing device for measurements of physical properties of flows or currents by means of at least one sensor head comprising means for emitting light for backscattering measurements, the standardizing device comprising at least two partially transparent reflector elements.

19. The measuring system of claim 16, further comprising a homogenization device, said homogenization device including a convergent flow or current inlet for the acceleration of the flow or current and a homogenization part for the homogenization of a concentration and velocity distribution of the flow or current, this homogenization device being mounted or mountable onto the transport line upstream of at least one of said sensor heads.

20. A method for the determination of physical properties of flows or currents, comprising the steps of:

a) independently detecting a parameter by at least three sensor heads, the three sensor heads being in a fixed position during the determination of said physical properties;

b) determining, for each one of said at least three sensor heads, fluctuations of said parameter and converting them into a measuring signal;

c) using stochastic methods, correlating the measuring signals concurrently created in a first pair of sensor heads by fluctuations in said parameter, and determining a first time of flight from correlating measuring the signals;

d) using stochastic methods, correlating the measuring signals concurrently created in a second pair of sensor heads by fluctuations in said parameter, and determining a second time of flight from correlating the measuring signals;

e) determining a distance between said sensor heads of said first and of said second pair of sensor heads;

f) for the first pair of sensor heads, evaluating a quotient of the distance of the sensor heads and of the first time of flight;

g) and evaluating, for the second pair of sensor heads, a quotient of the distance of the sensor heads and of the second time of flight; and h) calculating a two dimensional flow or current velocity from the quotients evaluated for the two pairs of sensor heads.

21. The method of claim 20, wherein said parameter is backscattered light, light being emitted into the flow or current by at least three sensor heads, wherein fluctuations of the backscattered light intensity are detected, the detected signals being converted into measuring signals, these measuring signals being correlated, wherein times of flight are calculated from said correlations between the sensor heads, wherein optical distances between said sensor heads are determined, and wherein said two dimensional flow or current velocities are calculated from the quotient of the optical distances between sensor heads and the times of flight.

* * * * *